(12) United States Patent
Takahashi et al.

(10) Patent No.: US 9,376,938 B2
(45) Date of Patent: Jun. 28, 2016

(54) WASTE HEAT POWER GENERATOR

(75) Inventors: Toshio Takahashi, Tokyo (JP); Hirohisa Wakisaka, Tokyo (JP); Kouichi Machida, Tokyo (JP)

(73) Assignee: IHI CORPORATION (JP)

( * ) Notice: Subject to any disclaimer, the term of this patent is extended or adjusted under 35 U.S.C. 154(b) by 261 days.

(21) Appl. No.: 14/125,335

(22) PCT Filed: Jun. 21, 2012

(86) PCT No.: PCT/JP2012/065912
§ 371 (c)(1),
(2), (4) Date: Dec. 11, 2013

(87) PCT Pub. No.: WO2013/002123
PCT Pub. Date: Jan. 3, 2013

(65) Prior Publication Data
US 2014/0110945 A1    Apr. 24, 2014

(30) Foreign Application Priority Data
Jun. 27, 2011 (JP) .................. 2011-142093

(51) Int. Cl.
*F01K 19/10* (2006.01)
*F01K 25/00* (2006.01)
(Continued)

(52) U.S. Cl.
CPC ............... *F01K 27/02* (2013.01); *F01D 15/10* (2013.01); *F01K 25/08* (2013.01); *F01K 25/10* (2013.01);
(Continued)

(58) Field of Classification Search
CPC ......... F01K 27/02; F01K 25/08; F01D 15/10; F01D 5/043; F05D 2220/62; F05D 2220/31; F05D 2260/602

USPC ................... 60/651, 654, 670, 671
See application file for complete search history.

(56) References Cited

U.S. PATENT DOCUMENTS 2,495,745 A * 1/1950 Litton .......................... 290/52
4,602,925 A   7/1986 Huffman
(Continued)

FOREIGN PATENT DOCUMENTS

| CN | 1991181 A | 7/2007 |
| CN | 101532402 A | 9/2009 |

(Continued)

OTHER PUBLICATIONS

International Search Report and Written Opinion mailed Sep. 4, 2012 in corresponding PCT International Application No. PCT/JP2012/065912.
(Continued)

*Primary Examiner* — Hoang Nguyen
(74) *Attorney, Agent, or Firm* — Ostrolenk Faber LLP (57) ABSTRACT

The waste heat power generator (G) includes: an evaporator (1) configured to produce steam of a working medium; a power-generating device (2, 2a, 2b) configured to generate electric power while expanding the steam; a condenser (3) configured to condense the steam which has passed through the power-generating device (2, 2a, 2b); and a pump (5) configured to send the condensed working medium to the evaporator (1). A bottom portion (BT) of the power-generating device (2, 2a, 2b) is provided with a discharge port (8) configured to discharge the working medium liquefied inside the power-generating device (2, 2a, 2b), to the outside thereof. A discharge pipe (6) is provided in which one end thereof is connected to the discharge port (8) and the other end thereof is disposed in a channel for the working medium between the condenser (3) and the pump (5).

8 Claims, 6 Drawing Sheets

(51) Int. Cl.
*F01K 27/02* (2006.01)
*F01D 15/10* (2006.01)
*F01K 25/08* (2006.01)
*F01K 25/10* (2006.01)
*F01D 5/04* (2006.01)

(52) U.S. Cl.
CPC ............. *F01D 5/043* (2013.01); *F05D 2220/31* (2013.01); *F05D 2220/62* (2013.01); *F05D 2260/602* (2013.01)

(56) References Cited

U.S. PATENT DOCUMENTS

| | | | | |
|---|---|---|---|---|
| 4,876,856 | A | * | 10/1989 | Iishiki et al. ................... 60/671 |
| 5,214,932 | A | * | 6/1993 | Abdelmalek ................ 62/238.4 |
| 6,032,467 | A | * | 3/2000 | Oshita et al. ................... 60/651 |
| 6,269,645 | B1 | * | 8/2001 | Yamaguchi .................... 60/653 |
| 7,841,306 | B2 | * | 11/2010 | Myers et al. ............... 122/406.5 |
| 2007/0147984 | A1 | | 6/2007 | Takahashi et al. |

FOREIGN PATENT DOCUMENTS

| | | |
|---|---|---|
| CN | 101818660 A | 9/2010 |
| JP | 57-158902 | 10/1982 |
| JP | 58-500448 | 3/1983 |
| JP | 60-075602 | 5/1985 |
| JP | B-06-061414 | 8/1994 |
| JP | 2000-110514 | 4/2000 |
| JP | A-2004-012264 | 1/2004 |
| JP | 2004-346839 | 12/2004 |
| JP | 2006-242083 | 9/2006 |
| WO | WO 82/02741 A1 | 8/1982 |

OTHER PUBLICATIONS

Notice of Reasons for Rejection dated Apr. 7, 2015 in corresponding Japanese Patent Application No. 2011-142093 (with English language translation)(6 pages).

Chinese Office Action dated Dec. 2, 2014 in corresponding Chinese Patent Application No. 201280031149.5 with Search Report (12 pages).

* cited by examiner

WASTE HEAT POWER GENERATOR

CROSS-REFERENCE TO RELATED APPLICATIONS

The present application is a 35 U.S.C. §§371 national phase conversion of PCT/JP2012/065912, filed Jun. 21, 2012, which claims priority to Japanese Patent Application No. 2011-142093, filed Jun. 27, 2011, the contents of which are incorporated herein by reference. The PCT International Application was published in the Japanese language.

TECHNICAL FIELD

The present invention relates to a waste heat power generator which generates electric power using waste heat energy.

BACKGROUND ART

Conventionally, waste heat energy released from a factory, an incineration facility, or the like is recovered so as to perform electric power generation. The electric energy obtained from the electric power generation is reused, and thereby energy saving is advanced. In such a factory or a facility, the waste heat of about 300° C. or more (near 1000° C. in some cases) is used for the electric power generation, because high-pressure steam used to drive a power generator can be easily produced. On the other hand, much of the low-temperature waste heat of about 300° C. or less is still released into the atmosphere. Therefore, if the waste heat energy of the low-temperature waste heat which is not recovered in most cases in the related art is recovered to perform the electric power generation, a further energy reduction may be achieved.

Patent Document 1 shown below discloses a waste heat power generator which generates electric power using the waste heat energy of the low-temperature waste heat of about 300° C. or less by a Rankine cycle using a low-boiling working medium. Patent Document 2 shown below discloses a turbine generator having a structure in which the turbine rotor of an axial turbine and the rotor of a generator are directly connected to each other and they are rotatably supported by oil-lubricated bearings. The turbine generator disclosed in Patent Document 2 may be used in the waste heat power generator disclosed in Patent Document 1.

DOCUMENT OF RELATED ART

Patent Document

[Patent Document 1] Japanese Unexamined Patent Application, First Publication No. 2000-110514
[Patent Document 2] Japanese Unexamined Patent Application, First Publication No. 2004-346839

SUMMARY OF INVENTION

Technical Problem

As is well known, turbines are broadly classified into axial turbines in which fluid flows in the axial direction, and radial turbines in which fluid flows thereinto in the radial direction and the fluid is released therefrom in the axial direction. Generally, an axial turbine is suitable for a turbine having medium capacity or large capacity, and a radial turbine has high efficiency because the power recovery amount from fluid is great. In addition, a turbine generator using a radial turbine further has the advantage of being capable of reducing its size and of simplifying its structure.

In the waste heat power generator using such a turbine generator, at the time of starting the operation thereof, the turbine generator has a temperature near the normal temperature. Therefore, when the working medium heated by the waste heat flows into the turbine generator, the working medium is cooled at a turbine casing or the like so as to be liquefied, and may be gathered in the inside (a turbine portion or a generator portion) of the turbine generator. In this case, the working medium (liquefied working medium) gathered in the inside of the turbine generator may collide with a rotor (a turbine rotor or a generator's rotor) of the turbine generator, and thereby loss may be increased or mechanical breakage may be caused.

In a case where bearings supporting a rotor of the turbine generator are oil-lubricated bearings, by circulating lubrication oil, the liquefied working medium which remains at the inside of the turbine generator can be discharged to the outside of the turbine generator together with the lubrication oil. However, in a case where bearings not using lubrication oil such as grease-lubricated bearings, gas bearings, or magnetic bearings are employed, since the mechanism to circulate lubrication oil such as the oil-lubricated bearings is not provided, the means to discharge the liquefied working medium to the outside of the turbine generator may be required.

The present invention has been made in view of the above circumferences, and aims to provide a waste heat power generator capable of easily discharging a working medium liquefied at the inside of a power-generating device, to the outside of the power-generating device.

Solution to Problem

In order to solve the above problems, according to a first aspect of the present invention, a waste heat power generator includes: an evaporator configured to collect waste heat energy and to produce steam of a working medium; a power-generating device configured to generate electric power while expanding the steam; a condenser configured to condense the steam which has passed through the power-generating device; and a pump configured to send the working medium condensed at the condenser, to the evaporator. A bottom portion of the power-generating device is provided with a discharge port configured to discharge the working medium liquefied inside the power-generating device, to the outside thereof. In addition, a discharge pipe is provided in which one end thereof is connected to the discharge port formed in the power-generating device and the other end thereof is disposed in a channel for the working medium between the condenser and the pump.

According to a second aspect of the present invention, in the first aspect, a valve device to open or close a passage of the discharge pipe is provided.

According to a third aspect of the present invention, in the second aspect, the valve device is configured to open the passage of the discharge pipe at the time operation is started, and to close the passage of the discharge pipe during operation.

According to a fourth aspect of the present invention, in any one of the first to third aspects, the power-generating device includes: an impeller which is configured to be rotationally driven by the steam; a generator which generates electric power by being driven using rotational driving force of the impeller; a rotary shaft which transmits the rotational driving force of the impeller to the generator; a casing housing at least the impeller and the generator. In addition, the casing is provided with a first chamber containing the impeller, a second chamber containing the generator, and a communication hole configured to guide the liquefied working medium from the first chamber to the second chamber.

According to a fifth aspect of the present invention, in the fourth aspect, the second chamber of the casing is provided with a guide passage configured to guide the working medium liquefied inside the power-generating device, to the bottom portion.

According to a sixth aspect of the present invention, in the fifth aspect, the guide passage is disposed so as to lead from an upper end to a lower end of the second chamber in a state where the power-generating device is disposed so that the rotary shaft is parallel to a vertical direction.

According to a seventh aspect of the present invention, in the fifth aspect, the guide passage is disposed so as to be sloped in a bottom of the second chamber in a state where the power-generating device is disposed so that the rotary shaft is parallel to a horizontal direction.

According to an eighth aspect of the present invention, in any one of the first to seventh aspects, a storage unit to store the working medium is provided in the channel between the condenser and the pump, and the other end of the discharge pipe is connected to the storage unit.

Effects of Invention

According to the present invention, a discharge port used to discharge a working medium liquefied inside a power-generating device, to the outside thereof is formed in a bottom portion of the power-generating device, and a discharge pipe connecting the discharge port of the power-generating device and a channel for the working medium disposed between a condenser and a pump is provided. Therefore, the working medium liquefied inside the power-generating device can be easily discharged to the outside of the power-generating device.

DESCRIPTION OF EMBODIMENTS

Hereinafter, waste heat power generators in embodiments of the present invention are described in detail with reference to the drawings.

First Embodiment

Figure 1:
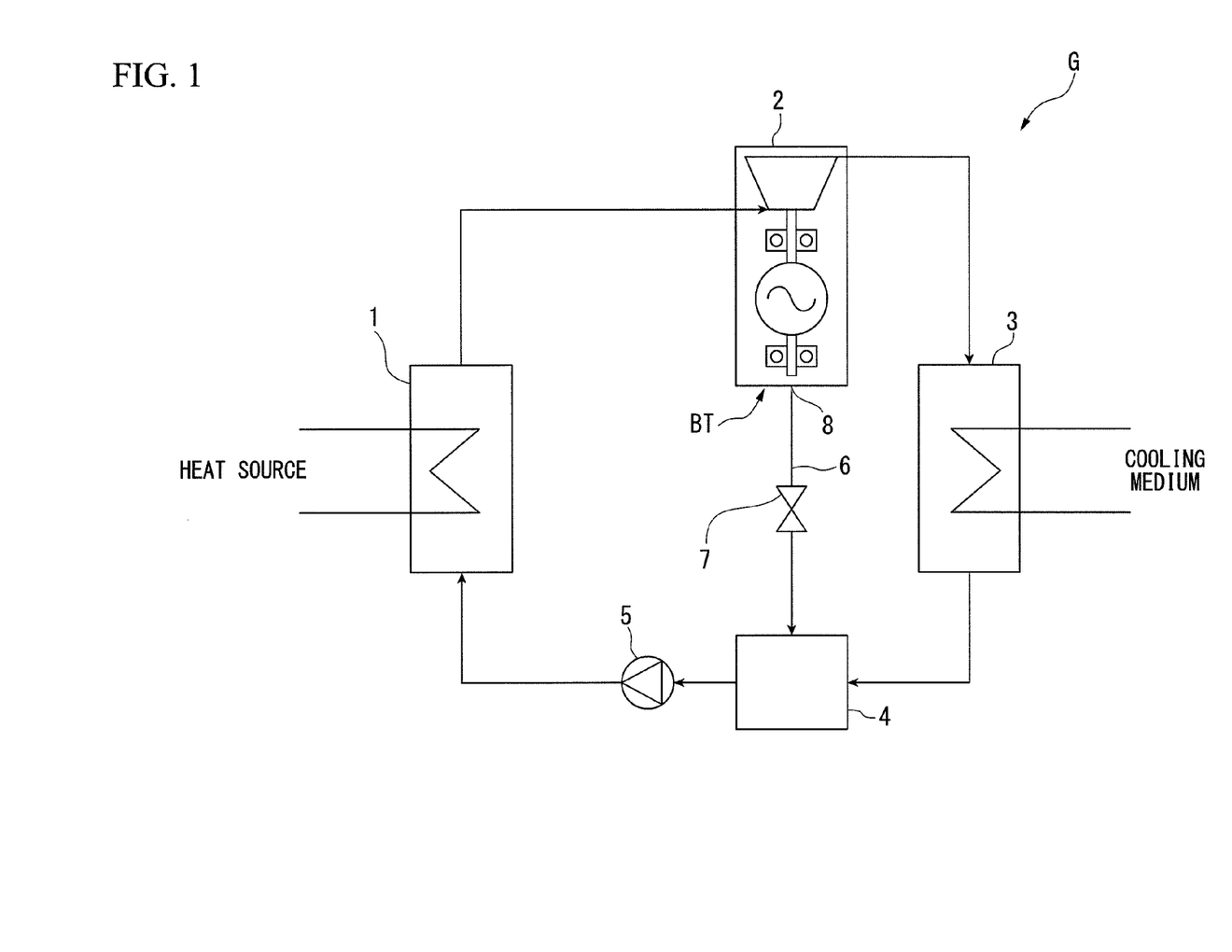
FIG. 1 is a block diagram schematically showing an overall configuration of a waste heat power generator in a first embodiment of the present invention.

FIG. 1 is a block diagram schematically showing an overall configuration of a waste heat power generator in a first embodiment of the present invention. As shown in FIG. 1, a waste heat power generator G of this embodiment includes an evaporator 1, an expansion turbine generator 2 (power-generating device), a condenser 3, a reservoir tank 4 (storage unit), a pump 5, a discharge pipe 6, and a solenoid valve 7 (valve device). The waste heat power generator G is a power generator using a Rankine cycle, and generates electric power using the waste heat energy of the low-temperature waste heat of about 300° C. or less (described as "heat source" in FIG. 1) released from a factory, an incineration facility, or the like.

The evaporator 1 recovers the low-temperature waste heat released from a factory or the like and produces the steam of a working medium. The expansion turbine generator 2 generates electric power while expanding the steam produced at the evaporator 1. A bottom portion BT of the expansion turbine generator 2 is provided with a discharge port 8 used to discharge the working medium liquefied at the inside of the expansion turbine generator 2, to the outside thereof. One end (first end) of the discharge pipe 6 is connected to the discharge port 8. In addition, the detailed structure of the expansion turbine generator 2 is described later.

The condenser 3 cools the steam which has passed through the expansion turbine generator 2, using a cooling medium such as coolant, so as to condense the steam (liquefaction). The reservoir tank 4 is a tank which temporarily stores the working medium condensed at the condenser 3. The other end (second end) of the discharge pipe 6 is connected to the upper part of the reservoir tank 4. The pump 5 pressures the working medium which is temporarily stored in the reservoir tank 4 after condensed at the condenser 3, and sends the working medium to the evaporator 1.

The discharge pipe 6 is provided in order to guide the working medium liquefied inside the expansion turbine generator 2, to the reservoir tank 4. One end of the discharge pipe 6 is connected to the discharge port 8 formed in the expansion turbine generator 2, and the other end thereof is connected to the upper part of the reservoir tank 4. In addition, it is preferable that the one end of the discharge pipe 6 connected to the discharge port 8 of the expansion turbine generator 2 be disposed at a higher position (a higher position in the vertical direction) than that of the other end thereof connected to the reservoir tank 4. In this case, it is possible to prevent the liquefied working medium from flowing back to the expansion turbine generator 2, and to appropriately let the working medium flow to the reservoir tank 4.

The solenoid valve 7 is attached to the discharge pipe 6, and is controlled by a controller (not shown). That is, the solenoid valve 7 is configured to open or close the passage of the discharge pipe 6. The solenoid valve 7 is provided in order to prevent the flow of the steam of the working medium from the expansion turbine generator 2 through the discharge pipe 6 to the reservoir tank 4, wherein the flow is caused due to the pressure difference between both ends of the discharge pipe 6 (the difference between the internal pressure of the expansion turbine generator 2 and the internal pressure of the reservoir tank 4) during the operation of the waste heat power generator G. That is, the solenoid valve 7 is mainly provided in order to prevent the loss due to the above flow of the working medium.

As the working medium used in the waste heat power generator G having the above configuration, a medium is preferably used in which its boiling point (a boiling point under the atmospheric pressure) is higher than 35° C. In this case, even if the low-temperature waste heat of about 300° C. or less is used, the steam of the working medium can be produced, and thus it is possible to generate electric power efficiently using the waste heat energy of such low-temperature waste heat. In addition, it is preferable that the maximum internal pressure of the device during operation be lower than or equal to 1 MPa (G) (1 MPa by the gauge pressure). In this case, by maintaining a low pressure in the entire device, it is possible to maintain a low internal pressure of the expansion turbine generator 2.

When a low internal pressure of the expansion turbine generator 2 is maintained, since high pressure is not applied to the casing of the expansion turbine generator 2, the evaporator 1, or the condenser 3, it is possible to ensure higher safety. In addition, since the above casing or the like does not have to have an excessive strength, it is possible to obtain a synergistic effect of being capable of producing the device with low costs. As the above working medium, hydrofluoroether (HFE), fluorocarbon, fluoroketone, perfluoropolyether, or the like can be used.

In the waste heat power generator G having the above configuration, the pump 5 sends the liquid working medium to the evaporator 1, the working medium is boiled and evaporated through the waste heat energy of the low-temperature waste heat (heat source) supplied to the evaporator 1, and thereby the steam thereof is produced. The steam produced at the evaporator 1 is supplied to the expansion turbine generator 2, and drives the expansion turbine generator 2 while the steam is expanded, whereby the electric power generation is performed at the expansion turbine generator 2. The steam which has passed through the expansion turbine generator 2 is cooled by the cooling medium at the condenser 3, and thereby is condensed (liquefaction). The working medium condensed by the condenser 3 is temporarily stored in the reservoir tank 4, and thereafter is pressured by the pump 5 so as to be sent to the evaporator 1 again. In this way, by repeating the evaporation and condensation of the working medium in the waste heat power generator G, the electric power generation is performed using the waste heat energy of the low-temperature waste heat.

At the time of staring the operation of the waste heat power generator G, the solenoid valve 7 is controlled by the controller (not shown) so as to open the passage of the discharge pipe 6. Thereby, even if the steam of the working medium which has been produced at the evaporator 1 and has flowed into the expansion turbine generator 2 is cooled and liquefied, the liquefied working medium is discharged from the discharge port 8 formed in the bottom portion BT of the expansion turbine generator 2, through the discharge pipe 6 to the reservoir tank 4. Therefore, it is possible to prevent the working medium (liquefied working medium) gathered in the inside of the expansion turbine generator 2 from colliding with a rotor of the expansion turbine generator, and thereby to prevent the increase in loss or the mechanical breakage.

In a case where the waste heat power generator G is during operation, the solenoid valve 7 is controlled by the controller (not shown) so as to close the passage of the discharge pipe 6. Thereby, the loss due to the flow of the steam of the working medium from the expansion turbine generator 2 through the discharge pipe 6 to the reservoir tank 4 is prevented. In addition, in a case where the waste heat power generator G is during operation, since the expansion turbine generator 2 is warmed by the working medium circulated in the waste heat power generator G, the working medium is rarely liquefied inside the expansion turbine generator 2. Therefore, unlike at the start of operation, the liquefied working medium does not have to be discharged from the expansion turbine generator 2, and thus the discharge pipe 6 can be closed.

Figure 2:
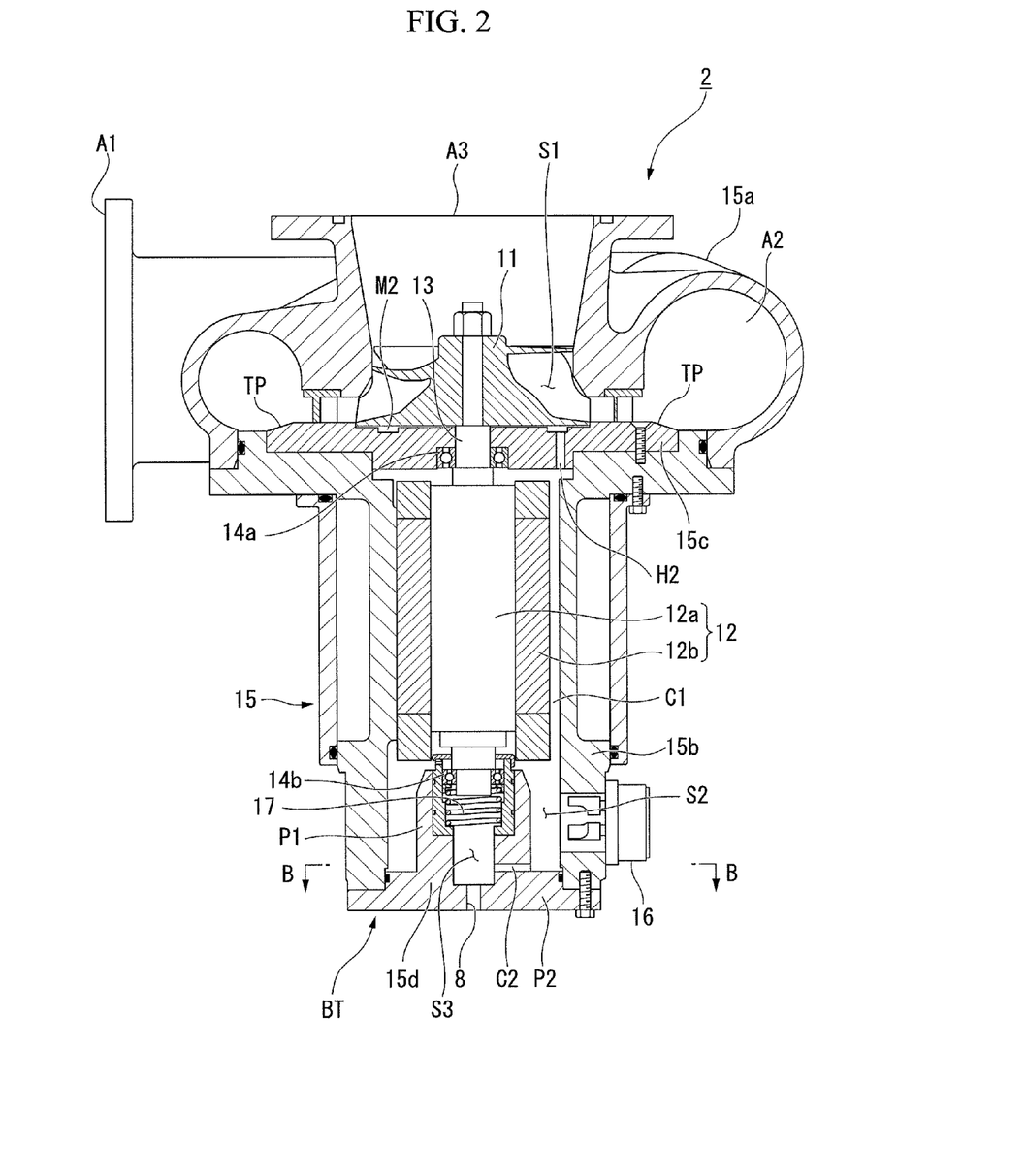
FIG. 2 is a cross-sectional view showing a configuration of an expansion turbine generator included in the waste heat power generator in the first embodiment of the present invention.

Next, the expansion turbine generator 2 provided in the waste heat power generator G is described in detail. FIG. 2 is a cross-sectional view showing the configuration of the expansion turbine generator included in the waste heat power generator in the first embodiment of the present invention. As shown in FIG. 2, the expansion turbine generator 2 includes an impeller 11, a generator 12, a rotary shaft 13, bearings 14a and 14b, and a casing 15. The expansion turbine generator 2 is disposed so that the axial direction of the rotary shaft 13 is parallel to the vertical direction (up-and-down direction).

The impeller 11 is a rotary vane which is rotationally driven by the steam produced at the evaporator 1. Specifically, the impeller 11 is rotationally driven by the steam supplied from the outside thereof in the radial direction, and releases the expanded steam from one side thereof in the rotation axis direction. The generator 12 is driven using the rotational driving force of the impeller 11, and generates electric power as, for example, three-phase AC. Specifically, the generator 12 includes a rotor 12a having permanent magnets, and a stator 12b having coils. The above permanent magnets are arranged in the outer peripheral surface of the rotor 12a, and the above coils are arranged in the inner peripheral surface of the stator 12b so as to face the outer peripheral surface of the rotor 12a. The rotor 12a is driven by the rotational driving force of the impeller 11, and the relative position between the rotor 12a and the stator 12b around the rotation axis is changed, whereby the electric power generation is performed.

The rotary shaft 13 is a shaft member used to transmit the rotational driving force of the impeller 11 to the generator 12, and is disposed so that the axial direction thereof is parallel to the vertical direction (up-and-down direction). The rotary shaft 13 is provided so as to extend in the rotation axis direction of the impeller 11, and is inserted into the rotor 12a of the generator 12 so as to be fixed thereto. In addition, the impeller 11 is fixed to the upper part of the rotary shaft 13 using a fastening screw or the like. Therefore, the impeller 11, the rotor 12a of the generator 12, and the rotary shaft 13 integrally rotate around the rotation axis.

The bearings 14a and 14b are provided in the casing 15 and rotatably support the rotary shaft 13 disposed to be parallel to the vertical direction (up-and-down direction). That is, the rotary shaft 13 is rotatably supported by the casing 15 through the bearings 14a and 14b in a state where the rotary shaft is parallel to the vertical direction. Specifically, the bearings 14a support the upper part of the rotary shaft 13 to which the impeller 11 is fixed, and the bearings 14b support the lower part of the rotary shaft 13.

The bearings 14a and 14b are rolling bearings, and in more detail are angular contact ball bearings. In addition, the bearings 14 are not limited to the angular contact ball bearings, and may be bearings such as deep groove ball bearings or tapered roller bearings which can support both of a radial load and a thrust load. Furthermore, the bearings 14a and 14b may be grease-lubricated bearings using grease in order to maintain smooth rotation, and may be non-contact bearings such as gas bearings or magnetic bearings.

The casing 15 is composed of a scroll casing 15a, a casing body 15b, bearing support members 15c and 15d, and the like. The casing 15 houses the impeller 11, the generator 12, and the rotary shaft 13, and forms the outer shape of the waste heat power generator G. Specifically, in the casing 15, a chamber 51 (first chamber) formed by the scroll casing 15a and the bearing support member 15c contains the impeller 11, and a chamber S2 (second chamber) formed by the casing body 15b and the bearing support members 15c and 15d contains the generator 12. That is, the casing 15 is provided with the chambers S1 and S2.

Figure 3:
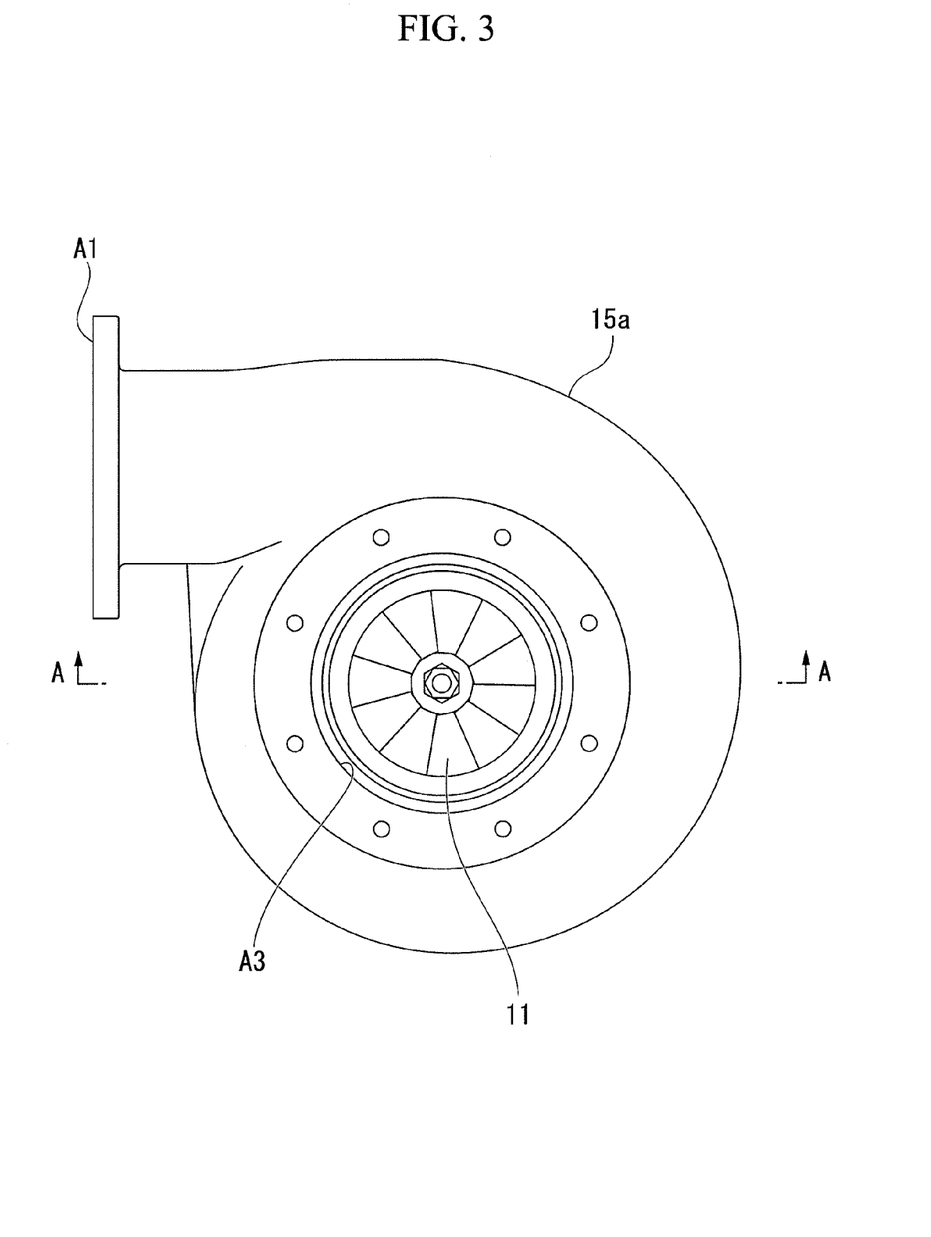
FIG. 3 is a plan view of a scroll casing included in the expansion turbine generator in the first embodiment of the present invention.

FIG. 3 is a plan view of the scroll casing included in the expansion turbine generator in the first embodiment of the present invention. In addition, FIG. 2 is the cross-sectional view along the line A-A in FIG. 3. As shown in FIGS. 2 and 3, the scroll casing 15a includes an inlet A1, a scroll chamber A2, and an outlet A3. The scroll casing 15a is provided so as to surround the periphery of the impeller 11 in a state where the part thereof disposed above the impeller 11 is opened.

The inlet A1 is the part into which the steam of the working medium is supplied, wherein the steam has been produced at the evaporator 1 and is used to rotationally drive the impeller 11. The inlet A1 is disposed so that the opening direction thereof (the inflow direction of the working medium) is parallel to the horizontal direction. The scroll chamber A2 is formed in an annular shape encircling the impeller 11 around the rotation axis thereof in a state where one end of the scroll chamber is connected to the inlet A1. The scroll chamber A2 supplies the steam supplied from the inlet A1, to the impeller 11 from the outside thereof in the radial direction. The outlet A3 is the part from which the expanded steam which has rotationally driven the impeller 11 is released to the outside, and is positioned above the impeller 11.

The casing body 15b is an approximately cylindrical member in which the chamber S2 (the chamber formed by the casing body 15b and the bearing support members 15c and 15d) contains the generator 12 and part of the rotary shaft 13. A groove constituting a guide passage C1 which guides the working medium liquefied inside the chamber S2, to the bottom portion BT of the expansion turbine generator 2 is formed at each of positions (for example, 3 positions) in the inner peripheral surface of the casing body 15b. The grooves are formed so as to extend from the upper end to the lower end of the chamber S2 in the axial direction of the rotary shaft 13. The stator 12b of the generator 12 is fixed to the inner peripheral surface of the casing body 15b over approximately entire circumference thereof, and thereby the guide passages C1 are formed between the casing body 15b and the stator 12b of the generator 12. That is, the guide passages C1 are formed by the above grooves of the casing body 15b and the outer peripheral surface of the stator 12b, and are disposed so as to lead from the upper end to the lower end of the chamber S2.

The casing body 15b is provided with a connector 16 used to output the electric power generated at the expansion turbine generator 2, to the outside thereof. Cables (not shown) are connected to the connector 16 from the outside of the expansion turbine generator 2, and thereby the electric power generated at the expansion turbine generator 2 is output to the outside through the cables. In addition, the connector 16 is electrically connected through wirings to the coils provided in the stator 12b.

Since the steam is supplied into the expansion turbine generator 2, the casing 15 has to have a sealed structure. Accordingly, it is preferable that a hermetic connector capable of sealing connection parts be used as the connector 16. In addition, as described above, it is preferable that the internal pressure of the device be set to be lower than 1 MPa (G). If the expansion turbine generator 2 has a hermetic structure, the internal pressure of the casing generally becomes equal to the approximately intermediate pressure between the inlet pressure and the outlet pressure of the turbine. Therefore, when the maximum internal pressure of the device during operation is set to be lower than or equal to 1 MPa (G), the internal pressure of the casing 15 can be set to be lower than 1 MPa (G).

Figure 4:
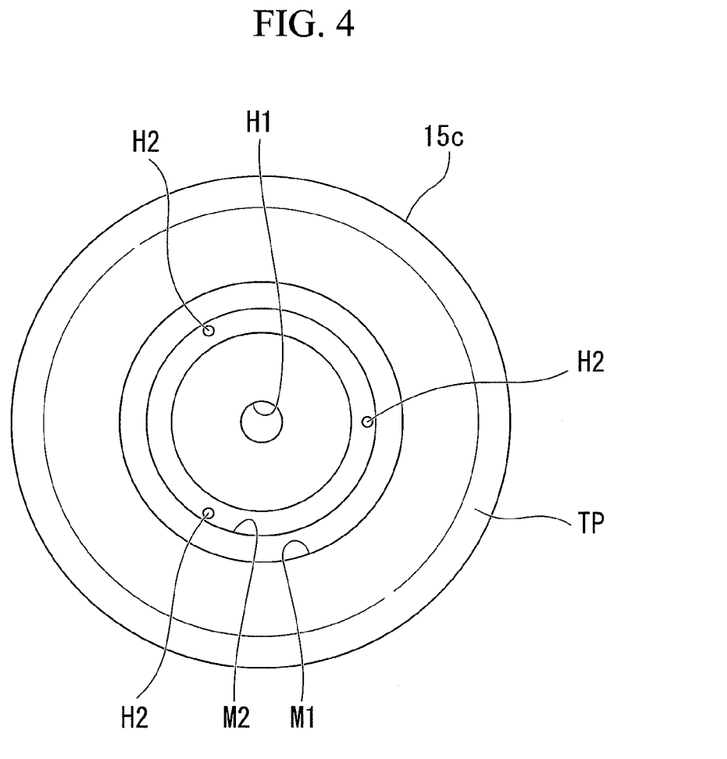
FIG. 4 is a plan view of a bearing support member included in the expansion turbine generator in the first embodiment of the present invention.

FIG. 4 is a plan view of the bearing support member 15c included in the expansion turbine generator in the first embodiment of the present invention. As shown in FIGS. 1 and 4, the bearing support member 15c is formed in a circular plate shape, and the central part thereof is provided with a hole H1 into which the rotary shaft 13 is inserted. The bearings 14a are attached to the central part in the lower surface of the bearing support member 15c. The central portion in the upper surface of the bearing support member 15c is provided with a concave portion M1, wherein the concave portion M1 is formed in a circular shape in the plan view thereof, and is formed so as to be depressed downward so that the bottom of the impeller 11 is disposed therein.

A groove M2 is formed inside the concave portion M1, wherein the groove M2 is formed in an annular shape encircling the hole H1, and is used to collect the working medium (liquefied working medium) gathered in the concave portion M1. Furthermore, a communication hole H2 which leads from the upper surface to the lower surface of the bearing support member 15c is formed at each of positions (for example, 3 positions) in the groove M2. The communication holes H2 communicate with both of the chamber S1 in which the impeller 11 is contained and the chamber S2 in which the generator 12 is contained, and guide the liquefied working medium from the chamber S1 to the chamber S2. In addition, since the communication holes H2 are formed in the groove M2 inside the concave portion M1 in which the bottom of the impeller 11 is disposed, the communication holes H2 are disposed under the impeller 11.

A taper TP is formed at the outer edge in the upper surface of the bearing support member 15c over the entire circumference thereof, wherein the level of the taper TP becomes gradually lower from the position near the center of the bearing support member, to the outer edge thereof. By forming the taper TP, without deteriorating the efficiency of the expansion turbine generator 2 as far as possible, it is possible to prevent the working medium liquefied inside the scroll chamber A2 from flowing into the concave portion M1 (the portion in which the bottom of the impeller 11 is disposed), and to prevent the increase of loss or the mechanical breakage due to this flowing.

In order to prevent the working medium liquefied in the scroll chamber A2 from flowing into the concave portion M1, it is only necessary to form an uneven part (for example, a part protruding in the vertical direction) in the outer edge in the upper surface of the bearing support member 15c. However, if such an uneven part is formed, the flow of part of the working medium guided into the scroll chamber A2 is blocked by the uneven part, and thereby the impeller drive efficiency may deteriorate. Therefore, the taper TP is formed in the outer edge in the upper surface of the bearing support member 15c. In addition, if the deterioration of efficiency is accepted, an uneven part such as a part protruding in the vertical direction may be formed in the outer edge in the upper surface of the bearing support member 15c.

In the bearing support member 15c, one side thereof is detachably attached to the scroll casing 15a using fastening bolts or the like, or the other side thereof is detachably attached to the casing body 15b using fastening bolts or the like. The bearings 14a are provided in the central part in the lower surface of the bearing support member 15c, and the rotary shaft 13 is rotatably supported by the bearings 14a in a state where the rotary shaft 13 passes through the hole H1 formed in the bearing support member 15c.

The bearing support member 15d is formed in a cylindrical shape with a bottom, which supports the bearings 14b. The bearing support member 15d includes a cylindrical part P1 and a bottom part P2. The bearing support member 15d is provided in the opposite side of the casing body 15b from the side thereof to which the bearing support member 15c is attached. The bottom part P2 of the bearing support member 15d is detachably attached to the casing body 15b using fastening bolts so that the cylindrical part P1 is disposed inside the casing body 15b. The bearings 14b are provided in the chamber S3 formed inside the cylindrical part P1 of the bearing support member 15d, and are disposed near the opening of the cylindrical part P1. The rotary shaft 13 is rotatably supported by the bearings 14b in a state where part of the rotary shaft 13 is inserted into the chamber S3.

A preload spring 17 which presses the bearings 14b toward the bearings 14a is provided in the chamber S3 of the bearing support member 15d. In addition, since the bearings 14b are connected to the bearings 14a through the rotary shaft 13, the pressing force of the preload spring 17 is transmitted not only to the bearings 14b but also to the bearings 14a, and the pressing force (that is, preload) is applied to both of the bearings 14a and 14b in the rotation axis direction. As described above, since the bearings 14a and 14b are the angular contact ball bearings, when appropriate preload is applied thereto in the rotation axis direction, rolling elements (balls) are held at the appropriate positions, and vibration or noise caused by rotation is reduced.

Figure 5:
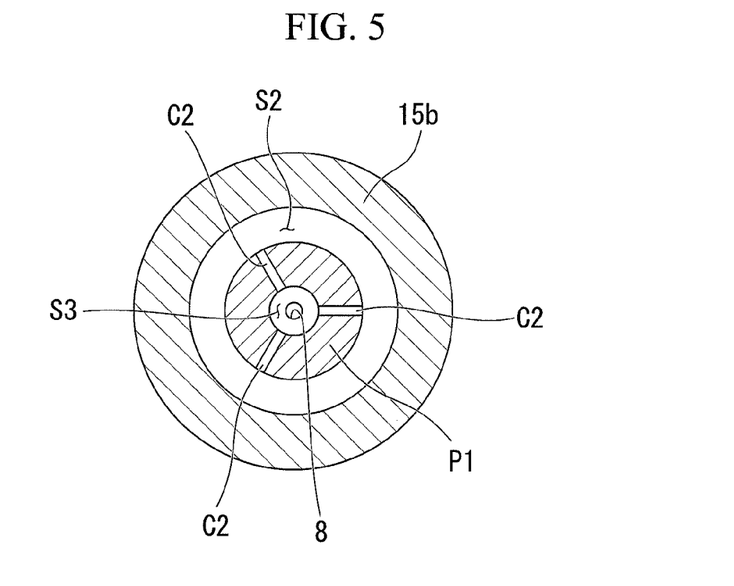
FIG. 5 is a cross-sectional view along the line B-B in the FIG. 2.

FIG. 5 is the cross-sectional view along the line B-B in the FIG. 2. As shown in FIGS. 2 and 5, a guide passage C2 is formed at each of positions (3 positions in FIG. 5) in the cylindrical part P1 of the bearing support member 15d. The guide passages C2 are passages which guide the liquefied working medium gathered in the chamber S2, to the chamber S3 inside the cylindrical part P1. The guide passages C2 are formed radially from the center of the cylindrical part P1 in the plan view thereof. In addition, the discharge port 8 is formed in the center of the bottom part P2 of the bearing support member 15d. Therefore, the liquefied working medium gathered in the chamber S2 is guided through the guide passages C2 into the chamber S3, and thereafter is discharged through the discharge port 8 to the outside of the expansion turbine generator 2.

When the steam which has been produced at the evaporator 1 is supplied to the expansion turbine generator 2 having the above configuration, the steam is supplied from the inlet A1 of the scroll casing 15a through the scroll chamber A2 to the impeller 11, and thereby the impeller 11 is driven rotationally. The expanded steam after rotationally driving the impeller 11 is released from the outlet A3 to the outside of the expansion turbine generator 2, and thereafter is guided to the condenser 3.

When the impeller 11 is rotationally driven, the rotational driving force thereof is transmitted to the generator 12 through the rotary shaft 13, and the rotor 12a of the generator 12 is rotated together with the impeller 11 and the rotary shaft 13. The impeller 11, the rotor 12a of the generator 12, and the rotary shaft 13 are rotated at the high rotation speed of about several tens of thousands rpm by the steam from the evaporator 1. When the rotor 12a is rotated, the relative position between the rotor 12a and the stator 12b around the rotation axis is changed, and thereby electric power of, for example, three-phase AC is generated. The generated electric power is output to the outside the expansion turbine generator through the connector 16 and the cables (not shown).

At the time of starting the operation of the waste heat power generator G, the expansion turbine generator 2 is in a state of being not warmed by the working medium circulated in the waste heat power generator G. Therefore, when the steam of the working medium produced at the evaporator 1 is guided to the expansion turbine generator 2, the steam is cooled at the scroll casing 15a or the like, and thereby may be liquefied. In addition, the working medium which has remained inside the expansion turbine generator 2 may be liquefied while the waste heat power generator G is stopped, and may be gathered in the inside of the expansion turbine generator 2. In this way, at the time the operation of the waste heat power generator G is started, there is a high possibility that the liquefied working medium is gathered in the expansion turbine generator 2.

When the working medium liquefied inside the scroll chamber A2 of the scroll casing 15a goes over the taper TP formed at the outer edge in the upper surface of the bearing support member 15c and flows into the concave portion M1 (see FIG. 4), the working medium is collected in the annular groove M2 formed inside the concave portion M1. The working medium collected in the groove M2 is guided through the communication holes H2 to the chamber S2 in which the generator 12 is disposed. The working medium guided to the chamber S2 is guided to the bottom portion BT of the expansion turbine generator 2 through the guide passages C1 formed between the casing body 15b and the stator 12b of the generator 12.

The working medium guided to the bottom portion BT is guided through the guide passages C2 into the chamber S3 inside the cylindrical part P1 of the bearing support member 15c, and thereafter is discharged through the discharge port 8 to the outside of the expansion turbine generator 2. At the time of starting the operation of the waste heat power generator G, since the solenoid valve 7 is controlled so as to open the passage of the discharge pipe 6, the working medium discharged from the expansion turbine generator 2 is guided through the discharge pipe 6 into the reservoir tank 4. In addition, in a case where the waste heat power generator G is in operation, since the solenoid valve 7 is controlled so as to close the passage of the discharge pipe 6, the discharge of the liquefied working medium from the expansion turbine generator 2 is not performed.

As described above, in this embodiment, the discharge port 8 used to discharge the working medium liquefied inside the expansion turbine generator 2 to the outside thereof is formed in the bottom portion BT of the expansion turbine generator 2, and the discharge pipe 6 which connects the discharge port 8 of the expansion turbine generator 2 and the reservoir tank 4 is provided. Thereby, the working medium liquefied in the expansion turbine generator 2 can be easily discharged to the outside of the expansion turbine generator 2.

Furthermore, in this embodiment, since the solenoid valve 7 used to open or close the passage of the discharge pipe 6 is provided, the liquefied working medium discharged from the discharge port 8 of the expansion turbine generator 2 can be guided into the reservoir tank 4 at the time of starting the operation of the waste heat power generator G, and on the other hand, the flow of the steam of the working medium through the discharge pipe 6 to the reservoir tank 4 can be blocked during the operation of the waste heat power generator G.

Therefore, the loss during operation of the waste heat power generator G can be reduced.

Second Embodiment

Figure 6:
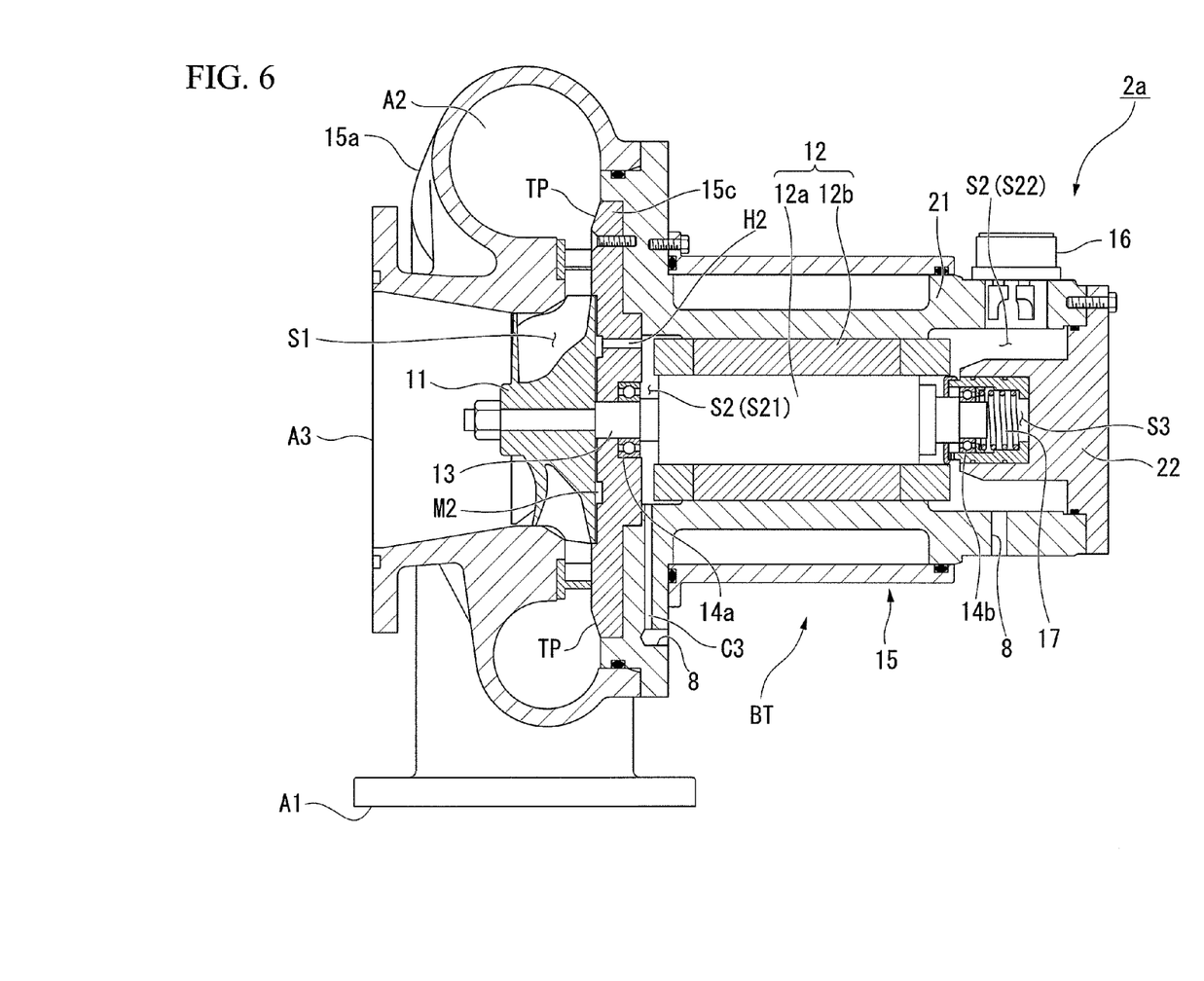
FIG. 6 is a cross-sectional view showing a configuration of an expansion turbine generator included in a waste heat power generator in a second embodiment of the present invention.

Next, a waste heat power generator in a second embodiment of the present invention is described below. The overall configuration of the waste heat power generator in this embodiment is approximately similar to that of the waste heat power generator G in the first embodiment shown in FIG. 1, but it is different from the first embodiment in that an expansion turbine generator 2a shown in FIG. 6 is included therein instead of the expansion turbine generator 2. FIG. 6 is a cross-sectional view showing the configuration of the expansion turbine generator included in the waste heat power generator in the second embodiment of the present invention.

In the following description, elements the same as the constituent elements in the first embodiment are denoted by the same reference signs, and descriptions thereof are omitted.

As shown in FIG. 6, the essential configuration of the expansion turbine generator 2a is the same as that of the expansion turbine generator 2 shown in FIG. 2. However, the expansion turbine generator 2a is disposed so that the axial direction of the rotary shaft 13 is parallel to the horizontal direction. Therefore, the structure of discharging the working medium liquefied inside the expansion turbine generator 2a to the outside thereof is slightly different from that of the expansion turbine generator 2. In addition, the expansion turbine generator 2a is disposed so that the inlet A1 of the scroll casing 15a faces downward in the vertical direction. Therefore, in the expansion turbine generator 2a, part of the casing 15 positioned near the inlet A1 of the scroll casing 15a constitutes the bottom portion BT of the expansion turbine generator 2a. That is, the lower part in the vertical direction of the expansion turbine generator 2a corresponds to the bottom portion BT.

Specifically, the expansion turbine generator 2a includes a casing body 21 instead of the casing body 15b, and includes a bearing support member 22 instead of the bearing support member 15d. That is, the casing 15 of the expansion turbine generator 2a is composed of the scroll casing 15a, the casing body 21, the bearing support member 15c, the bearing support member 22, and the like.

The inner peripheral surface of the casing body 21 is not provided with the grooves constituting the guide passages C1 (see FIG. 2). In contrast, the portion of the casing body 21 which corresponds to the bottom portion BT of the expansion turbine generator 2a is provided with a guide passage C3 and discharge ports 8 (two discharge ports 8 in FIG. 6). The guide passage C3 is formed so as to extend in the radial direction (for example, the radial direction of the rotor 12a) at the inside of the casing body 21. The guide passage C3 connects the chamber S2 (the chamber S21 formed by the casing body 21 and the bearing support member 15c) and one discharge port 8 formed in the casing body 21.

The other discharge port 8 is formed in the bottom portion BT of the expansion turbine generator 2a so as to communicate with the chamber S2 (the chamber S22 formed by the casing body 21 and the bearing support member 22) and with the outside thereof. The expansion turbine generator 2a is not provided with the guide passages C1 shown in FIG. 2, and in this case, the steam of the working medium may be guided from the chamber S21 to the chamber S22 through a gap (air gap) between the rotor 12a and the stator 12b which compose the generator 12, so as to be liquefied. Therefore, the other discharge port 8 is formed so that the chamber S22 and the outside thereof are communicated with each other. In addition, each of the two discharge ports 8 formed in the bottom portion BT of the expansion turbine generator 2a is connected to the discharge pipe 6 shown in FIG. 1.

The bearing support member 22 is formed in a cylindrical shape with a bottom, which supports the bearings 14b, similarly to the bearing support member 15d shown in FIG. 2. On the other hand, the bearing support member 22 differs from the bearing support member 15d shown in FIG. 2, in that the discharge port 8 and the guide passages C2 in the bearing support member 15d are not formed. In addition, the bearing support member 22 also differs from the bearing support member 15d shown in FIG. 2, in that the chamber S3 formed in the cylindrical part P1 of the bearing support member 15d is formed only at the part in which the bearings 14b are supported.

In a case where the waste heat power generator G is during operation, the expansion turbine generator 2a having the above configuration operates similarly to the expansion turbine generator 2 shown in FIG. 2. In addition, at the time of starting operation of the waste heat power generator G, in a state where the expansion turbine generator 2a is not warmed by the working medium circulated in the waste heat power generator G, when the steam of the working medium produced at the evaporator 1 is led to the expansion turbine generator 2a, the steam may be cooled at the scroll casing 15a or the like so as to be liquefied.

The working medium liquefied near the inlet A1 of the scroll casing 15a flows downward from the inlet A1 disposed so as to face downward in the vertical direction, and returns to the evaporator 1. On the other hand, the working medium which is liquefied inside the scroll chamber A2 of the scroll casing 15a and thereafter flows into the concave portion M1 (see FIG. 4) formed in the bearing support member 15c is collected in the annular groove M2 formed inside the concave portion M1, and is guided through the communication holes H2 to the chamber S2 (the chamber S21) containing the generator 12. The working medium guided to the chamber S2 (the chamber S21) is guided to the bottom portion BT of the expansion turbine generator 2a through the guide passage C3 formed in the casing body 21, and is discharged through the discharge port 8 to the outside of the expansion turbine generator 2a.

In a case where the working medium remains inside the chamber S2 (the chamber S22) of the expansion turbine generator 2a at the time of stopping the operation of the waste heat power generator G, when the temperature of the expansion turbine generator 2a drops, the working medium may be liquefied so as to be gathered in the chamber S2 (the chamber S22). The liquefied working medium is discharged to the outside of the expansion turbine generator 2a through the discharge port 8 connecting the chamber S2 (the chamber S22) and the outside. The working medium discharged from the two discharge ports 8 of the expansion turbine generator 2a is guided to the reservoir tank 4 through the discharge pipe 6 shown in FIG. 1.

As described above, in this embodiment, the expansion turbine generator 2a is employed which has the configuration and structure different from the expansion turbine generator 2 used in the first embodiment. However, in this embodiment, similarly to the expansion turbine generator 2 shown in FIG. 2, the bottom portion BT of the expansion turbine generator 2a is provided with the discharge port 8, and the discharge pipe 8 is provided which connects the discharge port 8 of the expansion turbine generator 2a and the reservoir tank 4. Therefore, the working medium liquefied inside the expansion turbine generator 2a can be easily discharged to the outside of the expansion turbine generator 2a. In addition, since the solenoid valve 7 which opens or closes the passage of the discharge pipe 6 is provided in this embodiment, the loss during the operation of the waste heat power generator G can be reduced.

Third Embodiment

Figure 7:
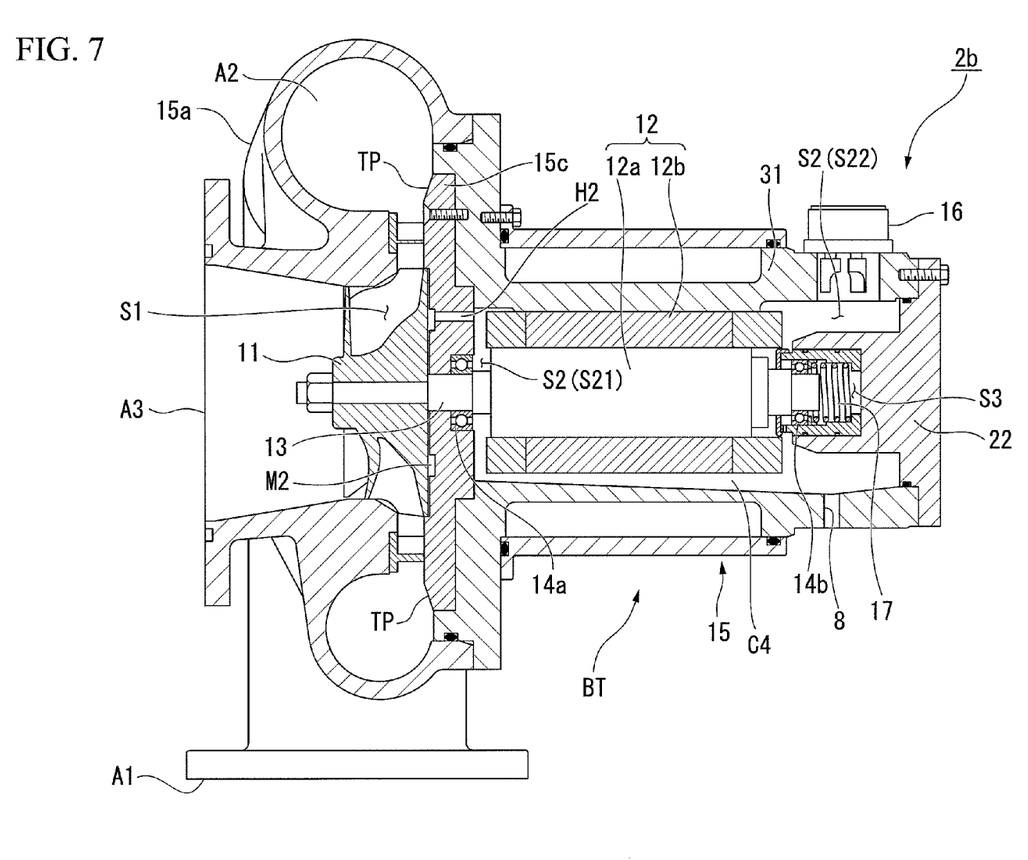
FIG. 7 is a cross-sectional view showing a configuration of an expansion turbine generator included in a waste heat power generator in a third embodiment of the present invention.

Next, a waste heat power generator in a third embodiment of the present invention is described below. The overall configuration of the waste heat power generator in this embodiment is approximately similar to that of the waste heat power generator G in the first embodiment shown in FIG. 1, but it is different from the first embodiment in that an expansion turbine generator 2b shown in FIG. 7 is included therein instead of the expansion turbine generator 2. FIG. 7 is a cross-sectional view showing the configuration of the expansion turbine generator included in the waste heat power generator in the third embodiment of the present invention.

In the following description, elements the same as the constituent elements in the first and second embodiments are denoted by the same reference signs, and descriptions thereof are omitted.

As shown in FIG. 7, similarly to the expansion turbine generator 2a shown in FIG. 6, the expansion turbine generator 2b is disposed so that the inlet A1 of the scroll casing 15a faces downward in the vertical direction and so that the axial direction of the rotary shaft 13 is parallel to the horizontal direction. The expansion turbine generator 2b has the configuration approximately similar to that of the expansion turbine generator 2a shown in FIG. 6, but is different therefrom in that a casing body 31 is included therein instead of the casing body 21. That is, the casing 15 of the expansion turbine generator 2b is composed of the scroll casing 15a, the casing body 31, the bearing support member 15c, the bearing support member 22, and the like.

The casing body 31 is not provided with the guide passage C3 and the one discharge port 8 (see FIG. 6) in the expansion turbine generator 2a. On the other hand, the inner peripheral surface of the casing body 31 which is positioned near the bottom portion BT of the expansion turbine generator 2b is provided with a groove constituting a guide passage C4 communicated with the chamber S21 and with the chamber S22. The guide passage C4 is disposed so as to be sloped so that the level thereof becomes gradually lower from the chamber S21 to the chamber S22. In addition, grooves becoming guide passages C4 may be formed in the inner peripheral surface positioned near the bottom portion BT of the expansion turbine generator 2b.

In the expansion turbine generator 2b having the above configuration, when the temperature of the expansion turbine generator 2b drops by stopping operation of the waste heat power generator G, the working medium which has remained in the chamber S2 (the chambers S21 and S22) of the expansion turbine generator 2b may be liquefied. The working medium liquefied in the chamber S21 is guided to the chamber S22 through the sloped guide passage C4, and thereafter is discharged through the discharge port 8 to the outside of the expansion turbine generator 2b together with the working medium liquefied in the chamber S22. In addition, the discharge port 8 in this embodiment is formed so as to communicate with the chamber S22 and with the outside of the expansion turbine generator 2b, and is disposed under, for example, the bearing support member 22 (that is, in the bottom portion BT). At the time of starting operation of the waste heat power generator G, the solenoid valve 7 is controlled so as to open the passage of the discharge pipe 6, and thereby the working medium discharged to the outside of the expansion turbine generator 2b is led to the reservoir tank 4.

As described above, the expansion turbine generator 2b in this embodiment has the configuration slightly different from that of the expansion turbine generator 2a (see FIG. 6) used in the second embodiment. However, in this embodiment, similarly to the expansion turbine generator 2a shown in FIG. 6, the bottom portion BT of the expansion turbine generator 2b is provided with the discharge port 8, and the discharge pipe 8 is provided which connects the discharge port 8 of the expansion turbine generator 2b and the reservoir tank 4. Therefore, the working medium liquefied inside the expansion turbine generator 2b can be easily discharged to the outside of the expansion turbine generator 2b. In addition, since the solenoid valve 7 which opens or closes the passage of the discharge pipe 6 is provided in this embodiment, the loss during the operation of the waste heat power generator G can be reduced.

Hereinbefore, the waste heat power generators in the embodiments of the present invention are described, but the present invention is not limited to the above embodiments and is limited only to the scope of the attached claims. A shape, a combination or the like of each component shown in the above embodiments is illustrative only, and additions, omissions, substitutions, or other modifications to the configuration can be adopted within the scope not departing from the gist of the present invention.

For example, in the above embodiments, the other end of the discharge pipe 6 is connected to the reservoir tank 4, but the other end of the discharge pipe 6 may be connected to a channel between the condenser 3 and the pump 5 (for example, to an outlet part of the condenser 3 or to an inlet part of the pump 5). In addition, if it is not necessary, the reservoir tank 4 can be omitted.

In the above embodiments, the solenoid valve 7 is used as the valve device which opens or closes the passage of the discharge pipe 6, but a valve other than a solenoid valve (for example, a mechanical valve device) can be employed. In addition, the present invention can be applied to a structure using a radial turbine generator such as a centrifugal expansion turbine generator or a diagonal flow expansion turbine generator as the power-generating device.

INDUSTRIAL APPLICABILITY

The present invention can be widely applied to a waste heat power generator which generates electric power using waste heat energy.

DESCRIPTION OF REFERENCE SIGNS

1 Evaporator
2, 2a, 2b Expansion turbine generator (power-generating device)
3 Condenser
4 Reservoir tank (storage unit)
5 Pump
6 Discharge pipe
7 Solenoid valve (valve device)
8 Discharge port
11 Impeller
12 Generator
13 Rotary shaft
15 Casing
BT Bottom portion
C1, C4 Guide passage
G Waste heat power generator
H2 Communication hole
S1, S2 Chamber

The invention claimed is:
1. A waste heat power generator comprising:
an evaporator configured to collect waste heat energy and to produce steam of a working medium;
a power-generating device configured to generate electric power while expanding the steam;
a condenser configured to condense the steam which has passed through the power-generating device; and a pump configured to send the working medium condensed at the condenser, to the evaporator, wherein a bottom portion of the power-generating device is provided with a discharge port configured to discharge the working medium liquefied inside the power-generating device, to the outside thereof, and a discharge pipe is provided in which one end thereof is connected to the discharge port formed in the power-generating device and the other end thereof is disposed in a channel for the working medium between the condenser and the pump, wherein the power-generating device includes:
an impeller configured to be rotationally driven by the steam;
a generator configured to generate electric power by being driven using rotational driving force of the impeller;
a rotary shaft configured to transmit the rotational driving force of the impeller to the generator;
a casing provided with a first chamber containing the impeller, a second chamber containing the generator, and a communication hole configured to guide the liquefied working medium from the first chamber to the second chamber.

2. The waste heat power generator according to claim 1, wherein
a valve device to open or close a passage of the discharge pipe is provided.

3. The waste heat power generator according to claim 2, wherein
the valve device is configured to open the passage of the discharge pipe at the time operation is started, and to close the passage of the discharge pipe during operation.

4. The waste heat power generator according to claim 1, wherein the second chamber of the casing is provided with a guide passage configured to guide the working medium liquefied inside the power-generating device, to the bottom portion.

5. The waste heat power generator according to claim 4, wherein
the guide passage is disposed so as to lead from an upper end to a lower end of the second chamber in a state where the power-generating device is disposed so that the rotary shaft is parallel to a vertical direction.

6. The waste heat power generator according to claim 4, wherein
the guide passage is disposed so as to be sloped in a bottom of the second chamber in a state where the power-generating device is disposed so that the rotary shaft is parallel to a horizontal direction.

7. The waste heat power generator according to claim 1, wherein
a storage unit to store the working medium is provided in the channel between the condenser and the pump, and
the other end of the discharge pipe is connected to the storage unit.

8. The waste heat power generator according to claim 1, wherein:
the casing includes:
a scroll casing that surrounds a periphery of the impeller;
a casing body which contains the generator and part of the rotary shaft;
a first bearing support member which is provided between the scroll casing and the casing body; and
a second bearing support member which is provided in an opposite side of the casing body from a side to which the first bearing support member is attached;
the first chamber is formed by the scroll casing and the first bearing support member, and the second chamber is formed by the casing body and the first and second bearing support members;
a concave portion is provided in an upper surface of the first bearing support member, the concave portion being formed to be depressed so that a bottom of the impeller is disposed in the concave portion;
a groove is formed inside the concave portion of the first bearing support member, the groove being configured to collect the liquefied working medium gathered in the concave portion; and
the communication hole leads from an upper surface to a lower surface of the first bearing support member, and communicates with the groove.

* * * * *